(12) United States Patent
Walker et al.

(10) Patent No.: US 6,310,626 B1
(45) Date of Patent: Oct. 30, 2001

(54) SYSTEM FOR MODELING A COLOR IMAGING DEVICE

(75) Inventors: Douglas G. Walker, Boston; H. Scott Gregory, Bedford; Robert F. Poe, Charlestown, all of MA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/256,798

(22) Filed: Feb. 24, 1999

(51) Int. Cl.[7] .................................................. G06T 11/40
(52) U.S. Cl. ........................................ 345/589; 395/500.23
(58) Field of Search ............................. 345/112, 150, 345/153, 154, 199, 431; 382/162, 167; 395/500.23; 700/1, 29–34, 42, 43, 52, 129

(56) References Cited

U.S. PATENT DOCUMENTS

| | | | |
|---|---|---|---|
| 4,500,919 | 2/1985 | Schreiber | 358/78 |
| 4,658,286 | 4/1987 | Schwartz et al. | 358/37 |
| 5,317,426 | * 5/1994 | Hoshino | 358/515 |
| 5,414,537 | 5/1995 | Omuro et al. | 358/518 |
| 5,991,525 | * 11/1999 | Shah et al. | 395/500.23 |
| 5,999,703 | * 12/1999 | Schwartz et al. | 395/109 |
| 6,043,909 | * 3/2000 | Holub | 358/504 |
| 6,075,888 | * 6/2000 | Schwartz | 382/167 |
| 6,108,442 | * 8/2000 | Edge et al. | 382/167 |

OTHER PUBLICATIONS

Merriam–Webster, Inc.; Merriam–Webster's Collegiate Dictionary, Tenth Edition, 1997, p. 413.*
Robert Hall Wallis, "Film Recording Of Digital Color Images", May, 1975, USCIPI Report 570, pp. 1–184.

* cited by examiner

*Primary Examiner*—Almis R. Jankus
*Assistant Examiner*—G. F. Cunningham
(74) *Attorney, Agent, or Firm*—David M. Woods (57) ABSTRACT

A system is disclosed that extends a high order polynomial model of an input device into a device region where measured input data is not available by selecting points in an unmeasured region, determining a slope at each of the selected points using a lower order model, and fitting the higher order model to the measured values and the slope values.

15 Claims, 7 Drawing Sheets

$$d/dG = \begin{bmatrix} 0 & 0 & 0 & 1 & 0 & 0 & 0 & 0 & 0 & 0 \\ 0 & 0 & 0 & 0 & 1 & 0 & 0 & 0 & 0 & 0 \\ 0 & 0 & 0 & 0 & 0 & 0 & 0 & 0 & 0 & 0 \\ 0 & 0 & 0 & 0 & 0 & 2 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 1 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \end{bmatrix}$$

SYSTEM FOR MODELING A COLOR IMAGING DEVICE

FIELD OF THE INVENTION

The present invention is directed to a system for modeling color imaging peripherals for the purpose of managing color reproduction properties and, more particularly, to a system that models an input device in regions of the input device color space that are incomplete because of inadequate data using slope information.

BACKGROUND OF THE INVENTION

Today, because of the importance of conveying images from one computer system to another, such as over the Internet, managing the color reproduction properties of color imaging peripherals or input devices, such as scanners and cameras, has also become important. Color management software uses device description data called "profiles" to describe the color rendering properties of the device. These profiles typically include a multidimensional interpolation table that transforms input device code values, such as RGB, into a CIE colorimetric color space such as CIELAB or CIE XYZ. Such a table is often built using a multi-dimensional polynomial model. Like the table, the model also transforms the code values into colorimetry.

The polynomial model is fit using measurements and data captured from the device to be modeled, the "characterization data." The use of a polynomial having a number of coefficients provides a convenient way to smooth out noise from the imaging device. The polynomial also allows one to predict device performance for code values in-between the values for which measurements are available. Using the polynomial in this way is called "interpolation" as long as there are measured values that surround the point at which the model is to be evaluated. When using the polynomial for values outside of the domain for which measurements are available the process is called "extrapolation." Because of the lack of surrounding measurements, extrapolation often produces much poorer results than interpolation.

When modeling an "output" device such as a color printer, one can easily collect data for the entire range of code value combinations that the device can print. One simply creates a digital target image that includes all the desired code values, prints it using the device, and measures the resulting colors. However, for an "input" device such as a digital camera or a scanner that digitizes an image from photographic or other input materials, it is difficult to collect data for the entire range of potential code values. For example, the input device can probably resolve colors much lighter than a diffuse white object in the scene being captured. Since data is typically collected from a color chart positioned somewhere in the scene, this implies that the color chart must somehow provide these very high reflectances. Even if this could be done using a self-luminous color chart or using special lighting or exposure techniques, it would be very cumbersome. To sum up, no practical color chart contains colors as bright, dark, or vivid as those of the real world.

Because of these difficulties, the characterization data used to fit mathematical models for input devices is incomplete. However, when building a profile for the device, one must anticipate the presence of values that are outside the domain covered by the characterization data. This means that the model must be used for extrapolating beyond the domain of the characterization data. This places much greater demands on the model than if it were only to be used for simply interpolating for values that are in-between measured values and still within their domain (or "convex hull"). As a result, the overall performance of the resulting profiles is compromised.

What is needed is an approach that allows the model to be accurately extended into regions where measured data is not available.

SUMMARY OF THE INVENTION

It is an object of the present invention to extend a color model of an input device to input regions where measured input data is not available.

It is another object of the present invention to provide an extended model that does not suffer from unrealistic fluctuations in regions where the input device is operable and measured input values are not available.

It is still another object of the present invention to provide an extended higher order model using the slope of a lower model.

The above objects can be attained by a system that extends a high-order polynomial model of an input device into a device input region where measured input data is not available by selecting points in the unmeasured region, determining a slope at each of the selected points using a lower order model, and fitting the higher order model to the measured values and the slope values. The invention creates a high-order model using measured device values and slope values of a low-order model in a region where measured data exists and in a region where measured data does not exist.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention allows production or creation of a polynomial model that describes the color characteristics of an input device, such as a film or color document scanner, or a digital camera, in a way that compensates for incomplete characterization data. It also has application to modeling output devices and to non-polynomial based models.

The invention first makes a prediction of how the polynomial should behave over a large domain that exceeds the domain of the measurements. This prediction is then used to fit a model that extrapolates better than models fit using other techniques. In the fitting procedure the initial prediction is for the partial derivative or slope, rather than the absolute value, the model should have outside of the measurement region. The use of the partial derivative or slope provides the desired extrapolation performance but without the inaccuracies caused by using estimates of the absolute value.

Figure 1A:
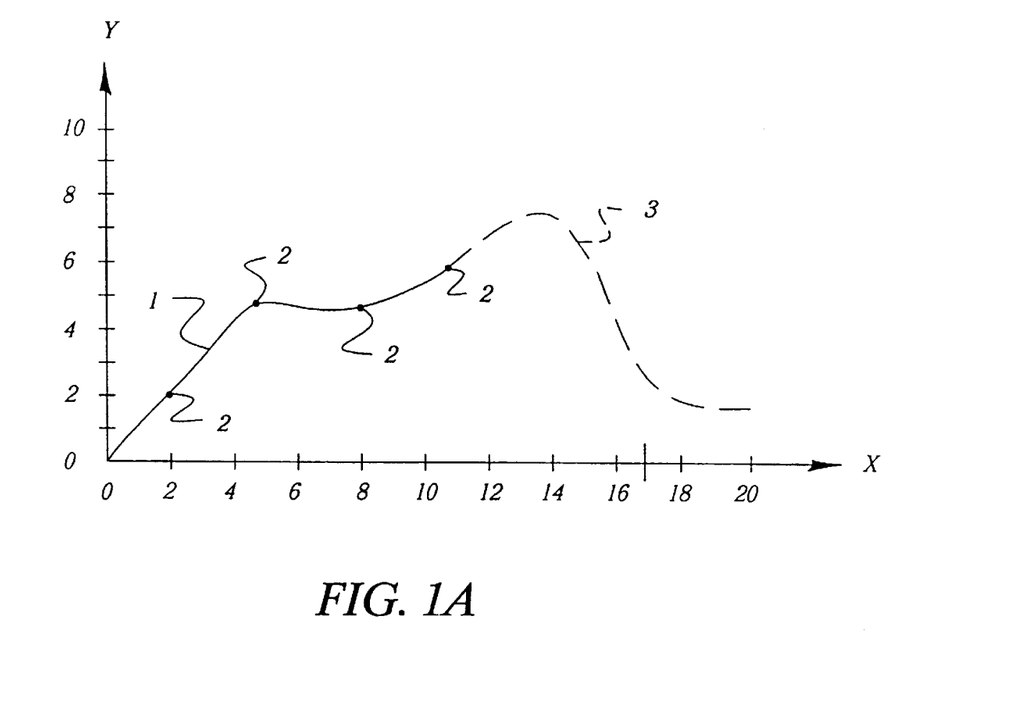
FIGS. 1A–1C graphically depict the operation of the present invention in one dimension.
Figure 1B:
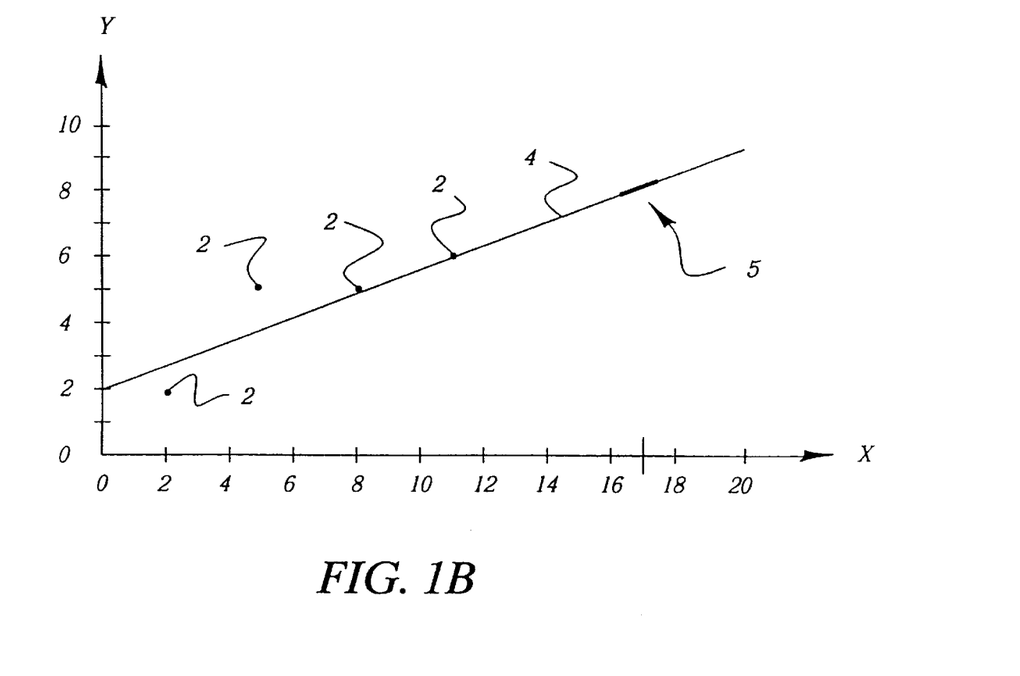
Figure 1C:
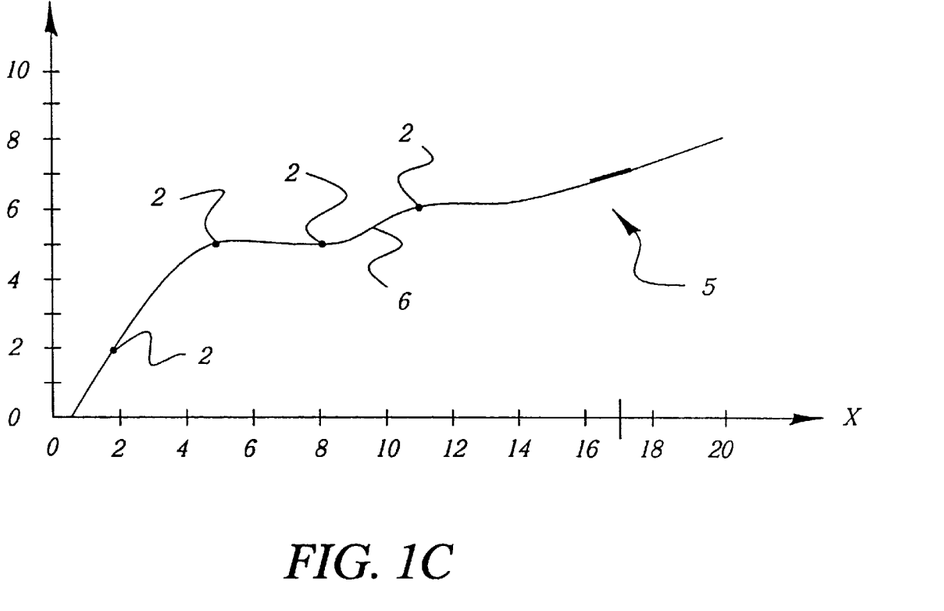

The principle behind operation of the present invention can be depicted graphically using the two dimensional curves of FIGS. 1A–1C. These figures use a single input and output dimension for purposes of illustration although in the invention there are three input and output dimensions. In FIG. 1A a high order model (or polynomial curve) 1 has been fit to a set of measured data points for a device represented by dots 2 along the curve 1. The dashed line 3 represents how the model behaves in a region where measured points are not available. For example, at the target point x=17, y equals approximately 2.5. It is assumed that the device being modeled does not behave in the unmeasured region as depicted by the dashed line 3. Therefore, this model does not agree with the actual behavior and behaves unreasonably in the unmeasured region. The present invention extends the polynomial model by using a low order model 4 of the device, such as a linear model (see FIG. 1B), to determine or predict a slope 5 at the target point (x=17). Note that at the target point (x=17), using the linear model 4, y equals approximately 8. An extended polynomial model is found by fitting a model (or curve) 6 to the slope and the measured points as depicted in FIG. 1C. That is, a curve is found that fits the measured data points and which has the desired slope at the target point. Note that at the target point y equals approximately 7 which more accurately represents the actual behavior of the device in the unmeasured region than the unextended model. Also note that the curve 6 has a shape that is somewhat different than the original model. In the mathematical literature, the input dimension x values are referred to as the "independent" data and the output dimension values are referred to as "dependent" data.

Figure 2:
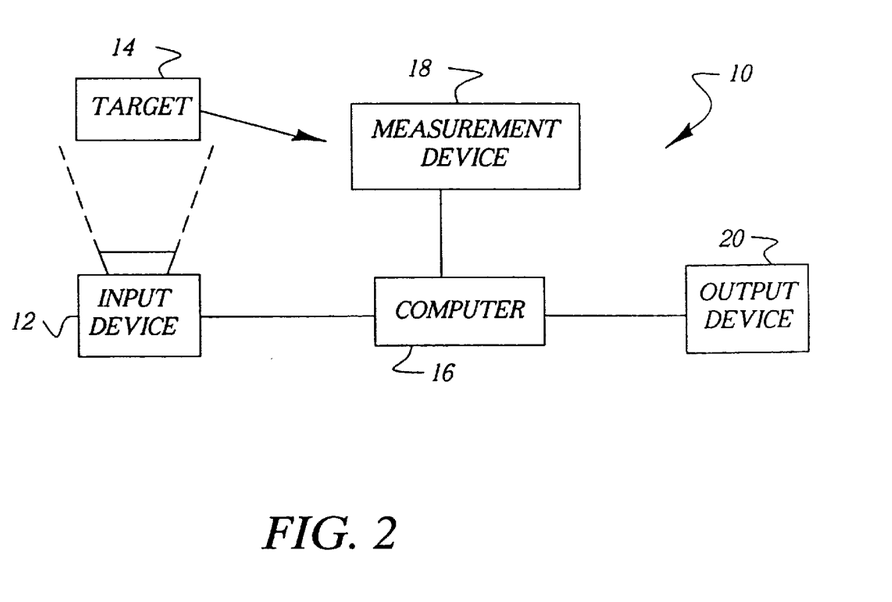
FIG. 2 illustrates hardware components of the present invention.
Figure 3:
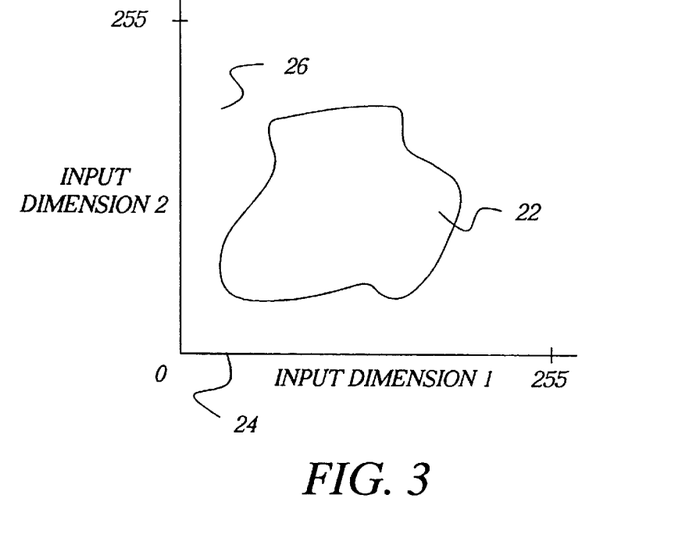
FIG. 3 shows input device regions where measured input values are not available.

The present invention is embodied in a hardware configuration 10 such as illustrated in FIG. 2. An input device 12, Such as a digital scanner or camera, captures a color target 14 having multiple color patches and supplies the input device code values (for example, RGB code values) to a computer 16. A color measurement device 18, such as a spectrophotometer, is used to measure the patches of the target and colorimetric values (for example, CIE, XYZ values) are produced (or a target with known patch colorimetric values is used). These measured input values only occupy a portion 22 of the color domain 24 of the input device 12 as shown in FIG. 3 (only two of the three input dimensions are illustrated). From this measured data a polynomial model can be conventionally created that will allow input device code values in the measured region to be accurately converted into color values of a known colorimetric space such as CIE L*, a*, b* which can then be converted into color values for an output device 20, such as a CMYK printer, using an output device model. The present invention allows the accurate conversion of input color values that fall in an unmeasured region 26 outside of the measured region.

Figure 4:
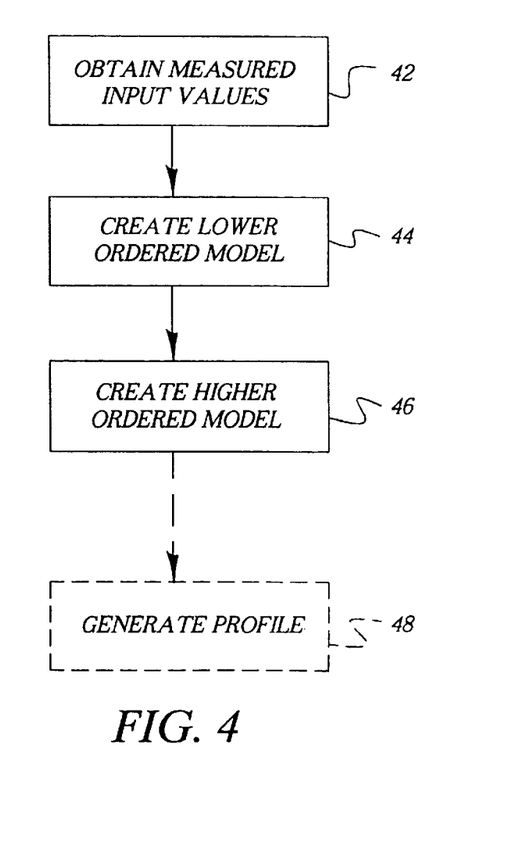
FIG. 4 depicts operations of the present invention.

The present invention creates a model that covers the unmeasured region as depicted in FIG. 4, by obtaining 42 the measured colorimetric (XYZ) and device (RGB) data and conventionally creating 44 a low-order model using the measured data. The higher ordered model is then created 46 and extends into the unmeasured region. The operations noted above will be discussed in more detail below (see FIGS. 6A and 6B). This model can then be used to produce 48 a device profile.

A typical procedure for building a profile for an input device, such as a digital camera, begins by capturing a scene that contains a color target with known spectral reflectances, for example, a Macbeth Color Checker target. A software program then extracts from the image the average code values associated with each square region (or "patch") of the target. Also, the known spectral reflectance information for the target is used along with an illuminant spectral power distribution to calculate CIE colorimetry for each patch. The characterization data in this case then consists of the code value (say RGB) and associated CIE colorimetric value (say XYZ) for each of the 24 patches in the Macbeth target. As discussed above, this data by no means covers the extremes of the color domain that the input device can capture.

Assume that the device produces RGB code values in the range 0 to 255. Then the profile building software builds a multi-dimensional interpolation table that transforms RGB values in [0,255] to colorimetry. However, the minimum and maximum values in the data set might be only 35 and 220 in R, G, or B. Clearly, it will be necessary to extrapolate beyond the available characterization data.

When fitting a mathematical model to a data set, it is useful to choose the form of the model so that it represents the physical and electronic properties of the device that generated the data. However, when developing a software program that must work for a variety of devices that have differing designs (for example, film scanners and digital cameras) one may need to pick a single form that is only an approximate model of the physics in any particular device. A multi-dimensional polynomial limited to quadratic terms in each independent variable (R, G, B) and with a limit on the total degree of any component monomial of 4 provides enough flexibility to model the range of devices typically encountered. A linearization step may also be used to condition the measured data prior to fitting the polynomial.

When fitting the model, it is useful to have more data than parameters so that the problem is over-determined and some smoothing will thus be done to eliminate measurement noise. The choice of model parameters (polynomial coefficients in this case) should be done so as to minimize error in some perceptually uniform color space such as CIELAB. One technique for doing this is to use CIE L*, a*, and b* as the dependent variables and use linear least-squares techniques to fit the model. Another approach is to use CIE X, Y, and Z as the dependent variables, CIELAB delta E as the measure of model performance, and a non-linear least-squares technique to estimate the parameters. Using XYZ seems to be a better match to the physics of the input device situation but non-linear least-squares can be computationally expensive. A hybrid approach is to use XYZ as the dependent data space and linear least-squares for fitting but with weights that are proportional to the partial derivative of CIELAB delta E with respect to X, Y, and Z. The hybrid approach is preferred, however, the invention is useful in a wide range of model fitting scenarios. For large data sets with several hundred patches, a quadratic polynomial model fit using one of the above techniques can reproduce the data with little error. For our example 24 patch camera data, such a model is essentially under-determined and will fit the data with almost no error. However, this does not mean that the model is a good one because, among other reasons, the model is based on incomplete data.

As is well known, the extrapolation performance of polynomials can be poor. Indeed, if one fits such a polynomial using our example data set of 24 patches from a digital camera one will find that the extrapolation performance is poor (a bad predictor of actual camera performance). One solution would be to only use the polynomial in the regions where there is data and use some other model outside this region. This is cumbersome because of the requirement that there be a smooth transition between the two models. Furthermore, one is still left with the problem of what type of model to use for extrapolation. The better approach, and the one used in the present invention, then is to stay with a single polynomial model but to fit it in a way that extrapolates better. One way of doing this is to add synthetic data that describes the desired model performance outside the domain of the real data in the unmeasured region 26.

The problem, of course, is how to generate this data lacking a model that is accurate over the entire device domain. One approach is to use a lower order polynomial consisting of only linear terms and a constant to fit the measured data. The quality of the fit will be low since the model will not be able to follow the curvature present in real devices. However, the linear (or more technically, "affine") model will at least extrapolate without curving off into wild and unreasonable values outside of the measurement region 22. This model can then be used to generate the synthetic data used to fit a more accurate higher order model that also extrapolates well. The synthetic data is simply provided to the fitting routine along with the real data but typically with less weighting.

The problem with this approach is that the synthetic data is inaccurate (since the linear model does not fit the measured data well). This introduces errors in the higher order model. We note that it is not really the absolute value of the synthetic data that one wants the higher order model to follow but rather the lower order model slope. That is, one does not want the lower order model to hit some specific values outside of the measurement region, but simply to extrapolate in a reasonable way such as linearly. Therefore, the synthetic data should not consist of the absolute value that the higher order model should hit but rather the slope or partial derivative that it "should" have at the desired points.

Figure 5:
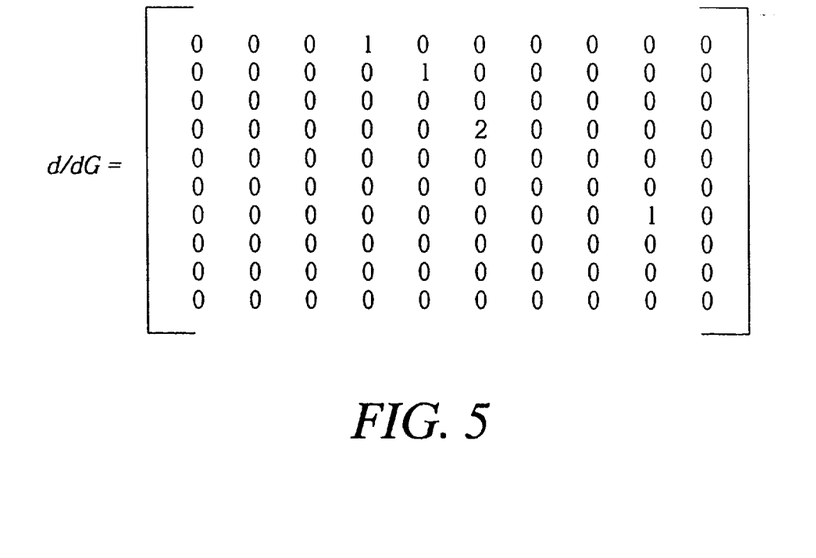
FIG. 5 depicts a partial derivative operator matrix.

The invention uses a formulation of the problem that allows the polynomial to be fit with constraints on both its value and partial derivative. An important insight is that a linear operator (matrix) can be used to transform the polynomial coefficients into the coefficients of the partial derivative of the polynomial. This is true since the same monomials used to describe the polynomial also can be used to describe its derivative. To form the derivative, the coefficients simply need to be scaled, summed, and reassigned to different monomials. This can be accomplished with a square matrix consisting of only integers. For example, assume that the polynomial consists of the monomials [1, R, $R^2$, G, RG, $G^2$, B, RB, GB, $B^2$]. Then the matrix d/dG depicted in FIG. 5 transforms the 10×1 element polynomial coefficient vector into the coefficient vector for the partial derivative with respect to the variable G.

This partial derivative operator matrix can be used to add the slope constraints to the same linear least-squares equation resulting from the measurement data.

A weighting factor, k, is used to scale the slope equations and thus trade-off a small amount of interpolation accuracy for smooth extrapolation. Rather than using the aim slope values as the dependent data vector, it is better to use them to scale the matrix of independent data. Thus, rather than having equations of the form k*actual_slope=k*aim_slope, one has k*actual_slope/aim_slope=k. This reduces the need to adjust the value of k based on the magnitude of the individual derivatives. In this way, a single value of k can be used to weight all of the partial derivative equations. k will generally range from about 0.5 when the input device is a high quality device to about 5.0 when the input device is a low quality device.

Consider the example given above of a 24-element data set from a digital camera and Macbeth Color Checkler. A 24*4 low order matrix is formed using columns of the independent variables R, G, and B and a constant column. A 4-element polynomial coefficient vector is then found for each of the dependent variables X, Y, and Z by supplying the low order matrix and the XYZ data to one of the fitting techniques described above. Next, a set of synthesized RGB values, that extend outside of the measurement domain are defined. This could simply be a rectangular lattice generated from 5 values between 0 and 255 in equal steps for a total of 5×5×5 125 values (or more preferably an 8×8×8 matrix). The partial derivative of the low order model with respect to R, G, and B is then evaluated at this set of extended values to form the synthetic data set of slopes (in this example, each partial is a constant since the model is linear although this is not necessary). The synthetic data set for a given dependent variable, say X, would then include 125*3=375 values of aim slopes.

To fit the higher order model, the 24×10 high order matrix is formed with one row for each of the 24 patches and one column for each monomial in the high order polynomial. In this example, the columns consist of the ten monomials listed above. Then a similar synthetic matrix is created by forming the monomials for the synthetic data set. This matrix is multiplied by the 10×10 partial derivative operator for each independent variable to create 3 125×10 matrices. Each row of these matrices are divided through by the corresponding aim slopes and scaled by a weighting factor, k (k of approximately 0.5 works well in this example). The 375×1 dependent data vector for these equations is equal to k. These 3 matrices and the high order matrix are concatenated into a 24+375×10 element matrix. Finally, the concatenated element matrix and the augmented dependent data, are provided to the least-squares fitting routine to estimate the polynomial coefficients for the high order model. The resulting model will both accurately interpolate the measurement data and also extrapolate well throughout the device domain. The above described procedure will be described below for additional clarity using a flow chart.

The input data of the model extension procedure includes measured independent (RGB code values) and dependent (CIE XYZ) data, a form of low-order polynomial or model, such as $X=a'_0+a'_1R+a'_3G+a'_6B$ with similar equations for Y and Z; a form of high-order polynomial or model, such as $X=a+a_1R+a_2R^2+a_3G+a_4RG+a_5G^2+a_6B+a_7RB+a_8GB+a_9B^2$ with similar equations for Y and Z, a synthetic weighting parameter k, such as 0.5 and a synthetic grid size of n, such as 5. The present invention transforms the measured input data, selected synthetic input points and the low order device model into a high order input device model. The high order device model can then be used to create an input device profile used to map color values between color spaces during processing of color images.

Figure 6A:
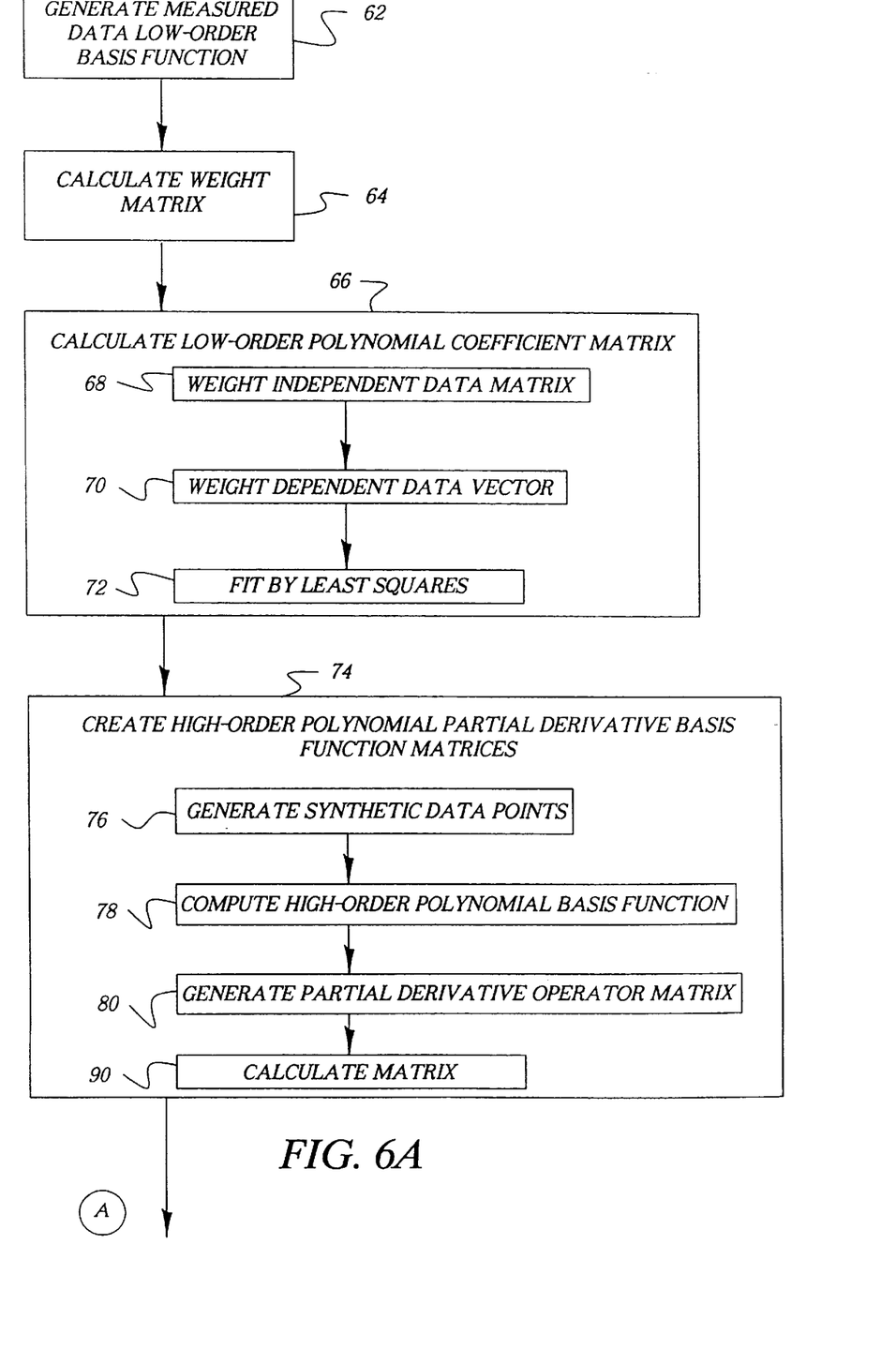
FIGS. 6A and 6B illustrate model creation operations.

For our example, we start with a 24 by 3 (24×3) matrix A of RGB device code values (the measured independent data), and a 24×3 matrix B of XYZ colorimetric values (the measured dependent data). The first operation, as depicted in FIG. 6A, is to generate 62 a low-order polynomial basis function matrix C for the measured data where the C matrix is 24 by 4 in our example. A basis function matrix is generated by evaluating each monomial at the various code values. An example of calculating a basis function is provided below.

The next operation is to conventionally calculate 64 the 24 by 3 weight matrix D for each measured dependent data point as the partial derivative (or slope) of CIELAB delta E with respect to X,Y,Z.

Then, the low order polynomial coefficient matrix is calculated 66 by calculating the ith column, for i=1 to 3, of a 4 by 3 low-order polynomial coefficient matrix E. This is accomplished by generating 68 an independent data matrix by scaling each column of matrix C by the ith column of the weight matrix D, generating 70 a dependent data vector by scaling the ith column of matrix B by the ith column of the weight matrix D, and supplying the weighted values to a least-squares fitting routine to perform 72 a least squares fit.

Figure 7:
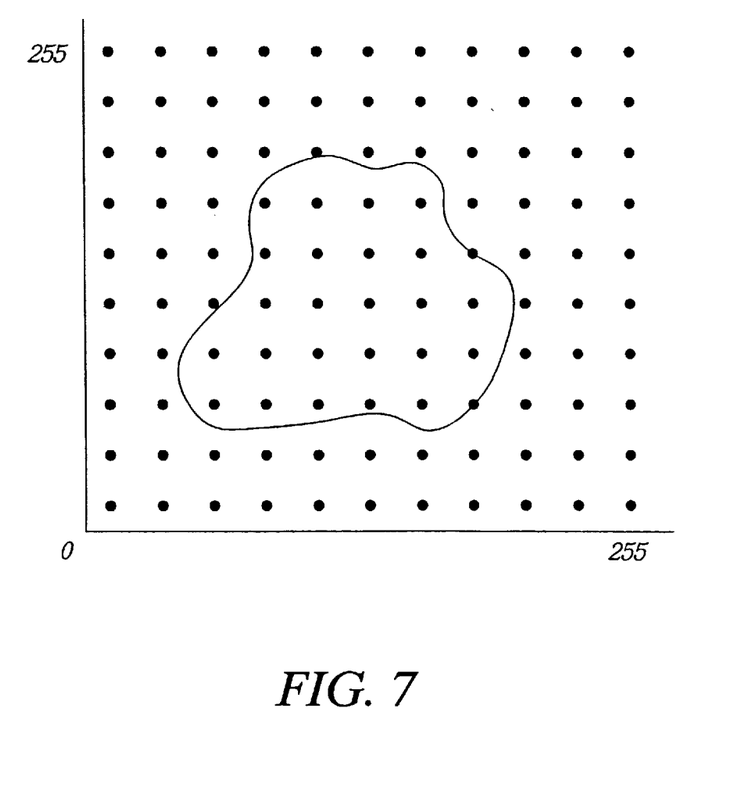
FIG. 7 illustrates points where data is synthesized.

The system then creates 74 a set of high-order polynomial partial derivative basis function matrices (Fr,Fg,Fb) with respect to each input variable R,G,B. This is accomplished by first selecting or generating 76 a set of $n^3$ by 3 synthetic data points G (see dots of two-dimensional representation of FIG. 7) comprising an equally spaced rectangular lattice over the entire three-dimensional input domain. Note that the lattice includes points within the measured data set. The second operation is to compute 78 a $n^3$ by 10 high-order polynomial basis function matrix H for the synthetic data points. For example, a synthetic RGB data value of [0.1, 0.2, 0.3] would form a row of H containing [1, 0.1, 0.01, 0.2, 0.02, 0.04, 0.3, 0.03, 0.06, 0.09] for the ten term polynomial listed above.

Figure 8:
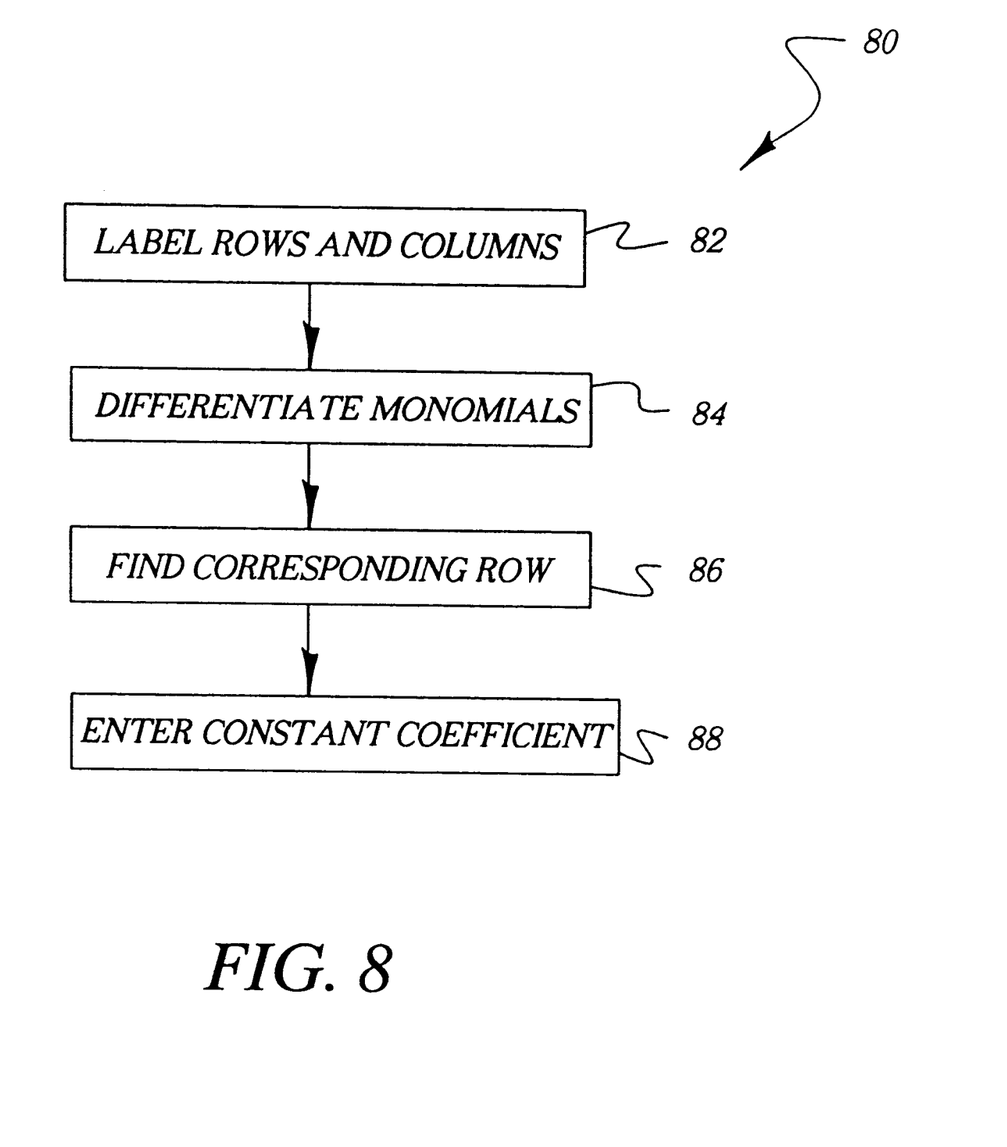
FIG. 8 depict generation of a partial derivative operator matrix.

A 10 by 10 partial derivative operator matrix I (Ir,Ig,Ib) is generated 80 with respect to the given input variable. The operation 80, as depicted in FIG. 8, includes labeling 82 the rows and columns of the matrix with the monomials, for example, using the equation noted above the rows and columns are labeled 1, R, $R^2$, G, RG, $G^2$, B, RB, GB, $B^2$. Next, the system differentiates 84 the monomials labeling each column, for example, $G^2 \rightarrow 2*G$. Then, for each partial derivative, the system finds 86 the row labeled with the same monomial, for example, 2*G== fourth row. Finally, at the given row/column intersection enter the constant coefficient of the partial derivative, for example, in the fourth row, sixth column, enter 2 (see the matrix d/dG depicted in FIG. 4).

The last operation in creating the partial derivative basis function is to calculate 90 the matrix F, for the given input variable, where F equals H*I (the matrix inner-product of H and I).

Figure 6B:
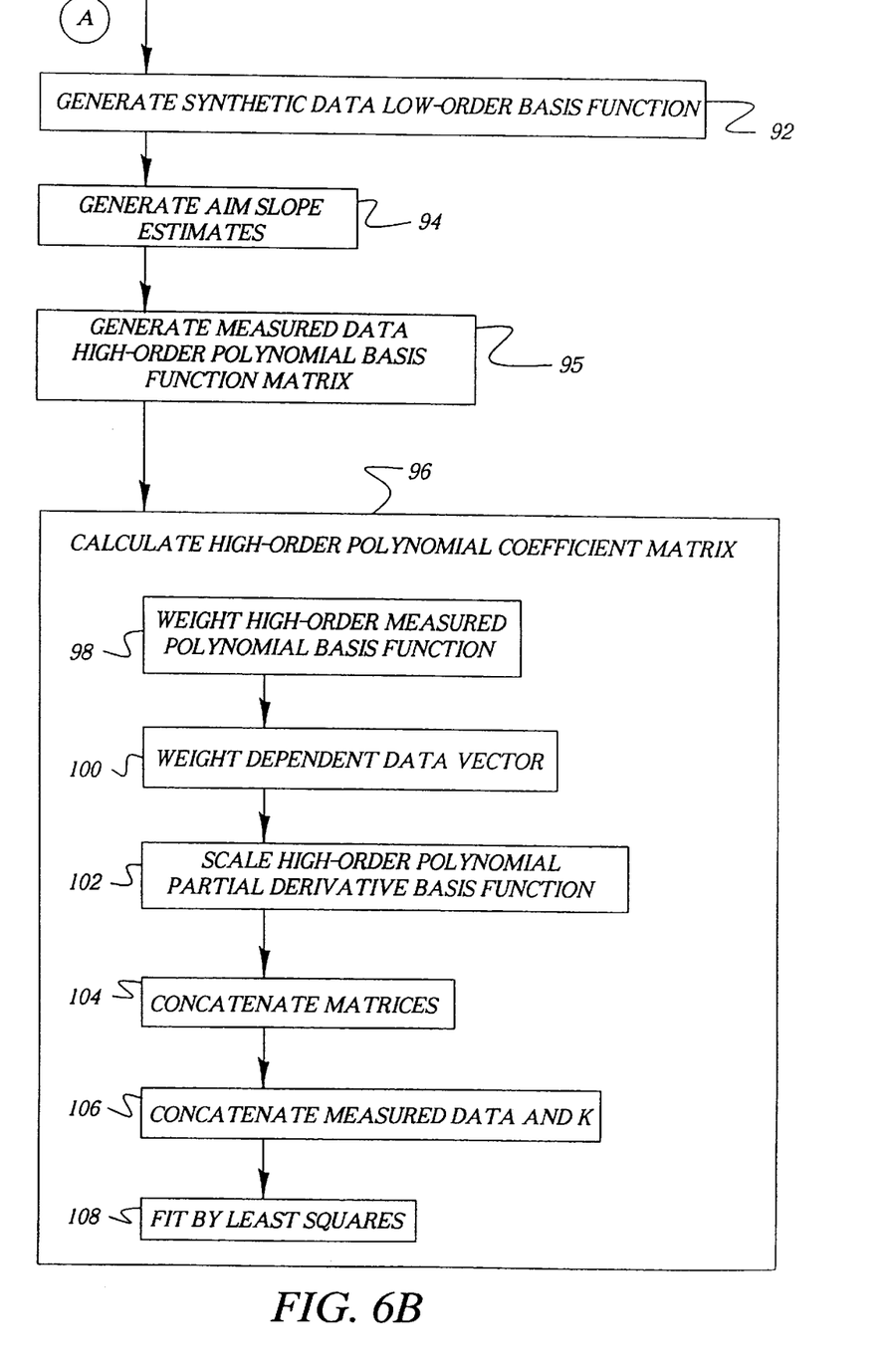

As depicted in FIG. 6B, the next operation is to create 92 an $n^3$ by 4 low-order polynomial basis function matrix J for the synthetic data.

Then, the system generates 94 the $n^3$ by 3 aim slope estimate matrix L by multiplying matrix J by matrix E.

Next, generate 95 the 24*10 measured data high-order basis function matrix M by computing the 10 monomials from the measured independent data matrix A.

The final operation is to calculate 96 the 10 by 3 higher-order polynomial coefficient matrix. This is accomplished, for i=1 to 3, by calculating the ith column of the high-order polynomial coefficient matrix P which involves generating 98 a weighted version of M by scaling each column by the ith column of weight matrix D. Next, the system generates 100 the dependent data vector by scaling the ith column of B by the ith column of the weight matrix D. Each column of the Fr, Fg, Fb matrices is scaled 102 by K/L (when K is a 375*1 vector, each element being the synthetic weighting parameter k). The weighted matrix from operation 98 is vertically concatenated 104 with the three matrixes from generation 102 and the weighted column of B is vertically concatenated 106 with three copies of K. Lastly, the results of the concatenation operations are supplied to a least-squares fitting routine to perform a conventional least squares fit.

Fitting a polynomial model using this technique offers advantages over other approaches. First, it allows the use of a high order polynomial to accurately interpolate the available measurement data. Second, the polynomial extrapolates in a desirable away throughout the entire device code value domain. This avoids the need for a cumbersome separate extrapolation model and the resulting potential discontinuities and other problems. Third, by using a synthetic data set based on derivative rather than absolute value, less error is introduced into the model.

The present invention has been described with respect to using a linear low order model, other low-order models or non-polynomial models can be used to determine the slope at the unmeasured data points as long as they behave reasonably with respect to actual device behavior in the unmeasured region.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of producing a model for measured input data describing color characteristics of a color device, comprising:

generating a set of extended input data values which extend beyond the measured input data;

estimating slope values at the extended input data values; and fitting a model to the combination of the measured input data and the slope values.

2. A method as recited in claim 1, wherein the model comprises a polynomial model.

3. A method as recited in claim 1, wherein the estimating uses a linear partial derivative operator.

4. A method as recited in claim 1, wherein the color device comprises an input device.

5. A method as recited in claim 1, further comprising using the model to build a profile.

6. A method of producing a model for measured input data describing color characteristics of an imaging device, comprising:

fitting an initial model to the measured input data;

selecting a set of extended input data values which extend beyond the measured input data;

using the initial model to estimate slope values at the extended input data values; and fitting a model to the combination of the measured data and the slope values.

7. A method of creating a device model of a color peripheral device, comprising:

measuring characteristics of the device and creating a first model of the device using a model fitting procedure; and using projected slope value information from the first model and measured characteristics as inputs to the fitting procedure to produce a second model better describing unmeasured aspects of the device.

8. A method of creating a device model of a color peripheral device, comprising:

measuring characteristics of the device and creating a first model of the device using a model fitting procedure; and using information from the first model and measured characteristics as inputs to the fitting procedure to produce a second model better describing unmeasured aspects of the device the information from the first model describes partial derivatives of the second model.

9. A method of creating a high-order device model of a color peripheral device, comprising:

generating a measured low-order model basis function matrix from a low-order model of the device having an order lower than the order of the high-order model and measured input data for the device;

determining a weight matrix for the measured input data;

producing a low-order polynomial coefficient matrix using the weight matrix, the measured output data, the measured low-order model basis function matrix and a least squares fitting procedure;

creating a high-order partial derivative basis function matrix using unmeasured device input data;

generating a low-order basis function matrix and the unmeasured device input data;

producing slope estimates at the unmeasured input data points using the low-order basis function matrix and the low-order model coefficient matrix;

generating a high-order basis function matrix for the measured device input data; and determining a high-order model coefficient matrix using the high-order basis function matrix, the weight matrix, the slope estimate, the high-order partial derivative basis function matrix, and a constant and the least squares fitting procedure.

10. A method as recited in claim 9, further comprising creating a profile from the high-order model coefficient matrix.

11. A method as recited in claim 9, wherein the low-order model is linear.

12. A method of creating a device model, comprising:

determining a slope of a first model in an unmeasured region where unmeasured device data exists; and using measured device data and the slope to create a second model.

13. A method as recited in claim 12, wherein the slope is determined in a measured region where the measured device data exists.

14. A computer readable storage medium for controlling a computer and including a procedure creating a high-order device model of a color peripheral device by measuring characteristics of the device, creating a low-order model of the device using a model fitting procedure, and producing an extended model into unmeasured regions using a slope of the low-order device model and the measured characteristics as inputs to the fitting procedure.

15. An apparatus, comprising:

an input device imaging a color target having known colorimetric values and producing measured target values; and a computer generating a set of extended input data values which extend beyond the measured target values, estimating slope values at the extended input data values, and fitting a model to the combination of the measured input data and the slope values producing a model of the input device.

* * * * *